(12) United States Patent
Morris

(10) Patent No.: US 6,557,260 B1
(45) Date of Patent: May 6, 2003

(54) EVEN-SLICE PIZZA CUTTER

(76) Inventor: Kenneth A. Morris, 4107 Milford Ave., Parma, OH (US) 44134

( * ) Notice: Subject to any disclaimer, the term of this patent is extended or adjusted under 35 U.S.C. 154(b) by 0 days.

(21) Appl. No.: 09/243,882

(22) Filed: Feb. 3, 1999

(51) Int. Cl.[7] .............................................. A21C 15/04
(52) U.S. Cl. ...................................................... 30/114
(58) Field of Search .............................. 30/114; 83/932, 83/620

(56) References Cited

U.S. PATENT DOCUMENTS

| | | | |
|---|---|---|---|
| 262,332 A | | 8/1882 | Tozer |
| 471,158 A | | 3/1892 | Westerman |
| 850,022 A | * | 4/1907 | Lewis ........................... 30/114 |
| 890,390 A | | 6/1908 | Zinn |
| 1,457,233 A | * | 5/1923 | Slovack ........................ 30/114 |
| 1,581,310 A | * | 4/1926 | Fetschan ...................... 30/114 |
| 1,613,223 A | * | 1/1927 | Davis ............................ 30/114 |
| 2,003,253 A | * | 5/1935 | Deutsch ........................ 30/114 |
| 2,906,020 A | * | 9/1959 | Welsh ............................ 30/114 |
| 2,971,549 A | * | 2/1961 | Langville ...................... 30/114 |
| 3,132,423 A | * | 5/1964 | De Lano ....................... 30/114 |
| 4,046,067 A | | 9/1977 | Loveland et al. ............. 99/543 |
| 4,111,112 A | | 9/1978 | Altman ......................... 99/538 |
| 4,250,618 A | * | 2/1981 | Custer et al. ................. 30/114 |
| 4,423,551 A | | 1/1984 | Chmela et al. ............... 30/142 |
| 4,574,479 A | | 3/1986 | Gramann ...................... 30/142 |
| D316,656 S | | 5/1991 | Hall ............................. D7/672 |
| 5,129,159 A | * | 7/1992 | Fuenzalida ................... 30/114 |
| 5,337,480 A | | 8/1994 | Codikow ...................... 30/114 |
| 5,421,249 A | | 6/1995 | Repisky et al. .............. 99/545 |
| 5,613,431 A | | 3/1997 | Tateno ......................... 99/541 |
| 5,873,294 A | * | 2/1999 | Sciuto .......................... 30/114 |
| 5,903,981 A | * | 5/1999 | Grow, II ...................... 30/114 |

* cited by examiner

*Primary Examiner*—M. Rachuba
(74) *Attorney, Agent, or Firm*—John D. Gugliotta

(57) ABSTRACT

Disclosed is a pizza cutting device that allows the user to cut a pizza in uniform, evenly-sized pieces on a consistent basis. The cutter consists of a circular frame that has a series of blades spanning across its hollow interior diameter. Sized so that the entire pizza fits within the interior diameter, the user simply presses down on a pair of handles located on the outside of the frame and the blades cut the pizza into uniform, even slices.

6 Claims, 7 Drawing Sheets

EVEN-SLICE PIZZA CUTTER

BACKGROUND OF THE INVENTION

1. Field of the Invention

The present invention relates generally to culinary utensils, and more specifically to a pizza cutter that divides the pizza into uniform, evenly-sized slices.

2. Description of the Related Art

Most of us are all too familiar with the common situation where, in ordering and eating a pizza, the size of the pieces contrast drastically in size. When this occurs, the large pieces are difficult to handle, often resulting in dropped sauce and toppings that can stain clothing and carpet. Furthermore, due to the fact that pizza is often hot, burns can result where the hot cheese, sauce and toppings drop onto one's person. Also, where the pizza serves as a meal for a number of people, the disproportionate pieces make for unequal servings and, as a result, further cutting is required to even-out the meal. From a business point of view, a poorly cut pizza relates directly to quality and workmanship in the food product. Accordingly, there is need for a means by which commercial pizza establishments and restaurants can ensure constant, evenly sliced pizzas on a consistent basis. The development of the present invention fulfills this need.

A search of the prior art did not disclose any patents that read directly on the claims of the instant invention. However, several references to food slicing and cutting devices were discovered. These devices neither anticipate nor disclose any embodiment that would preclude the novelty and the utilitarian functionality of the features of the present invention.

The following patents describe slicing devices that cut items such as fruits and vegetables into uniform wedges or slices:

U.S. Pat. No. 5,613,431, issued in the name of Tateno

U.S. Pat. No. 5,421,249, issued in the name of Repisky et al.

U.S. Pat. No. 5,337,480, issued in the name of Codikow

U.S. Pat. No. 4,111,112, issued in the name of Altman

U.S. Pat. No. 4,046,067, issued in the name of Loveland et al.

U.S. Pat. No. 471,158, issued in the name of Westerman

U.S. Pat. No. 262,332, issued in the name of Tozer

U.S. Pat. No. 4,574,479, issued in the name of Gramann, discloses a pizza cutter having an arcuate, angled cutting edge that is used to both to cut the pizza into slices and serve the slices in a manner similar to that of a spatula.

U.S. Pat. No. 4,423,551, issued in the name of Chmela et al., describes a pizza cutter having a sharpened cutting wheel and a planar sharpened cutting blade that doubles as a spatula for serving purposes.

U.S. Pat. No. Des. 316,656, issued in the name of Hall, describes the ornamental design for a multiple slice pizza cutter.

While several features exhibited within these references may be incorporated into this invention, alone and in combination with other elements, the present invention is sufficiently different so as to make it distinguishable over the prior art.

SUMMARY OF THE INVENTION

The present invention consists of a pizza cutting device that allows the user to cut a pizza in uniform, evenly-sized pieces on a consistent basis. The cutter consists of a circular frame that has a series of blades spanning across its hollow interior diameter. Sized so that the entire pizza fits within the interior diameter, the user simply presses down on a pair of handles located on the outside of the frame and the blades cut the pizza into uniform, even slices. Available in a variety of sizes, the present invention ensures uniform slicing that avoids the dangers and problems associated with disproportionate slices while conveying a quality professional food presentation.

It is therefore an object of the present invention to provide a multi-slice pizza cutter that cuts an entire pizza into slices at once.

It is another object of the present invention to provide a multi-slice pizza cutter that produces slices of uniform size and shape.

It is another object of the present invention to provide a multi-slice pizza cutter that produces slices that are easy to handle and minimize the likelihood of spilled or dropped toppings.

It is another object of the present invention to provide a multi-slice pizza cutter that produces slices that display a high-quality workmanship and maintain a professional appearance.

It is another object of the present invention to provide a multi-slice pizza cutter that is of a high-quality construction designed to withstand the rigors of both commercial and domestic use.

Finally, It is an object of the present invention to provide a multi-slice pizza cutter that is capable of handling a variety of pizza sizes.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

LIST OF REFERENCE NUMBERS

20 Pizza Cutter
21 Frame
22 Pizza Receiving Aperture
23 Cutting Blades
25 Slice Segments
26 Handle Apertures
27 Center Cap
30 Tapered Edge
31 Blade Receiving Slots
35 Cutting Edge
36 Top Edge
37 Frame End
38 Center End
40 Blade Support Tab
41 Fastener Receiving Cutout
45 Outer Surface
46 Blade Surface
47 Fastener Receiving Aperture
48 Blade Receiving Grooves
50 Threaded Fastener
51 Nut
52 Bolt
53 Threaded Portion
60 Pizza

DESCRIPTION OF THE PREFERRED EMBODIMENTS

1. Detailed Description of the Figures

Figure 1:
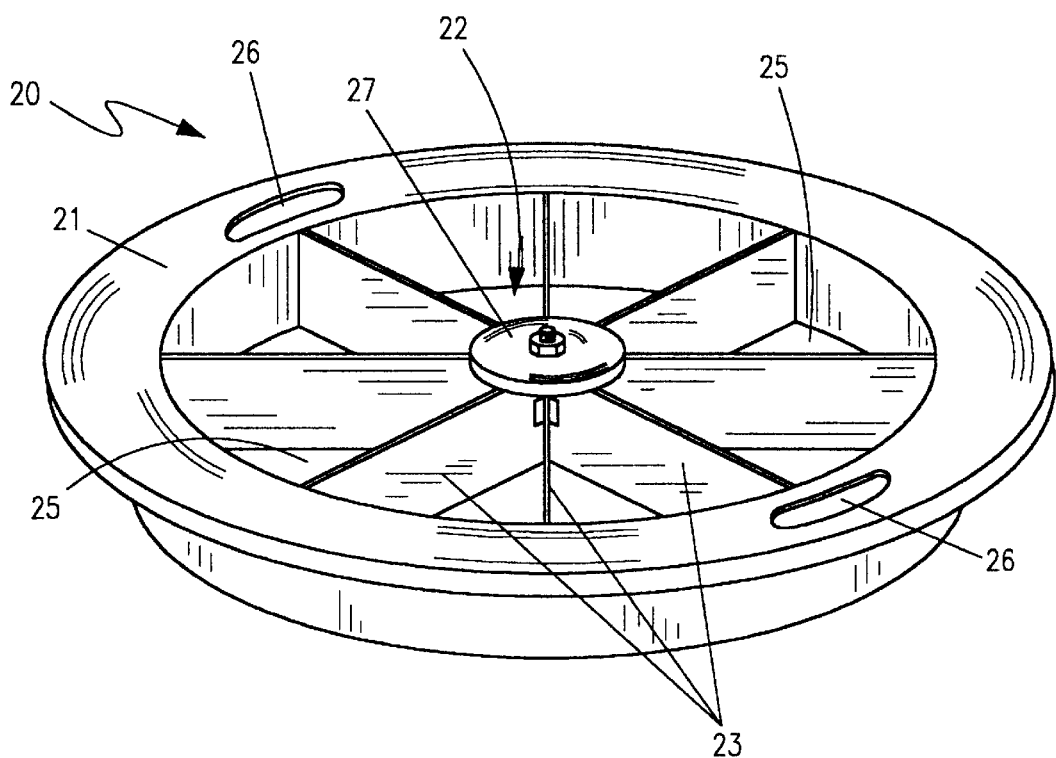
FIG. 1 is a perspective view of the multi-slice pizza cutter, according to the preferred embodiment of the present invention.
Figure 2:
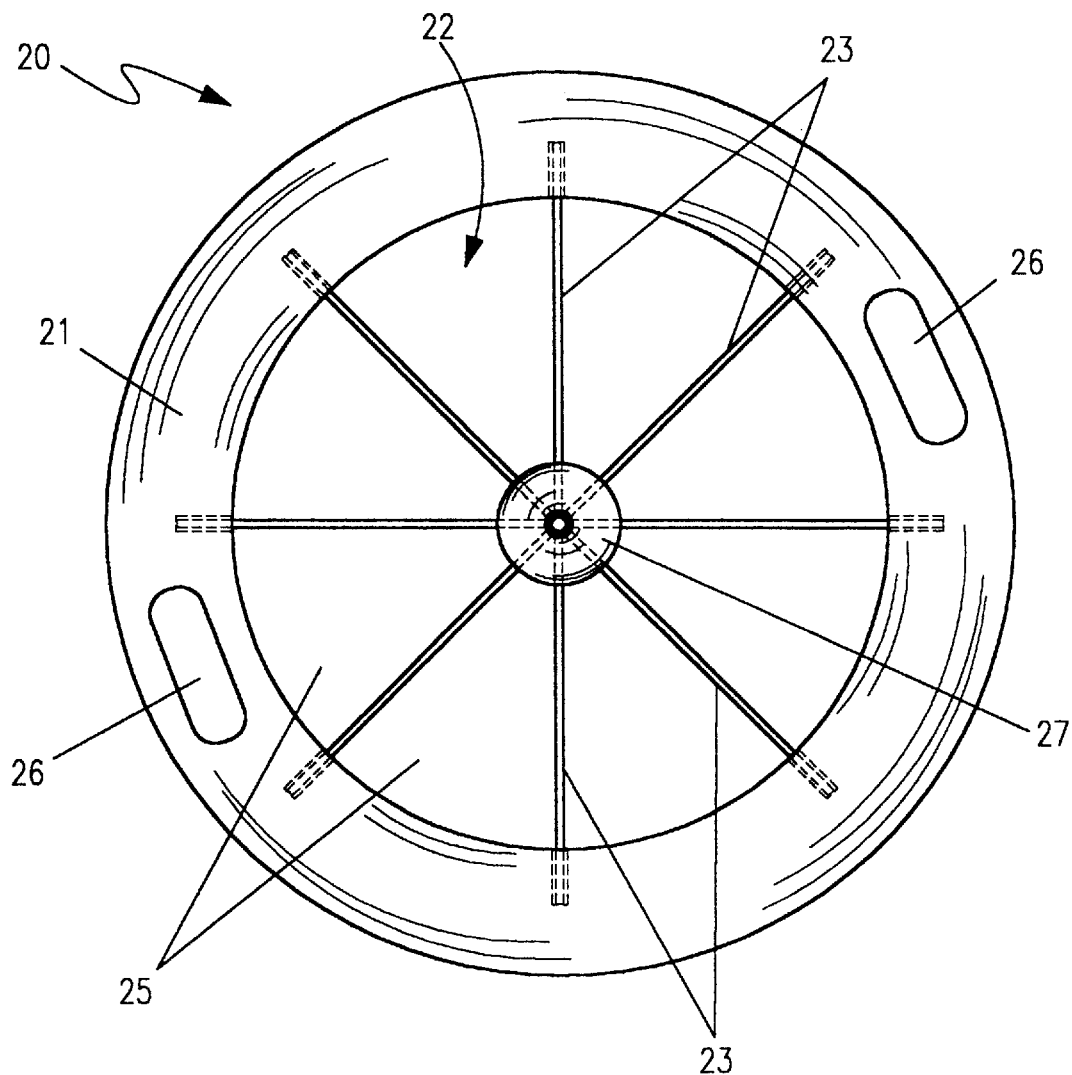
FIG. 2 is a top view of the multi-slice pizza cutter, according to the preferred embodiment of the present invention.

Referring now to FIGS. 1–2, depicted is the multi-slice pizza cutter, hereinafter pizza cutter 20, according to the preferred embodiment of the present invention. The pizza cutter 20 consists of a circular frame 21 having a hollowed center portion that forms a pizza receiving aperture 22. The frame 21 supports a plurality of cutting blades 23 that span across the pizza receiving aperture 22. The cutting blades 23 are positioned and oriented such that they intersect at the center of the pizza receiving aperture, forming equally sized slice segments 25. The frame 21 includes a pair of handle apertures 26 that allow for easy grasping and handling. A center cap 27 secures the cutting blades 23 at the center of the pizza receiving aperture 22. Depending upon the intended use of the pizza cutter 20 and the size of the pizza to be cut, its overall dimensions, particularly its diameter, as well as the number of cutting blades 23, can vary.

Figure 3:
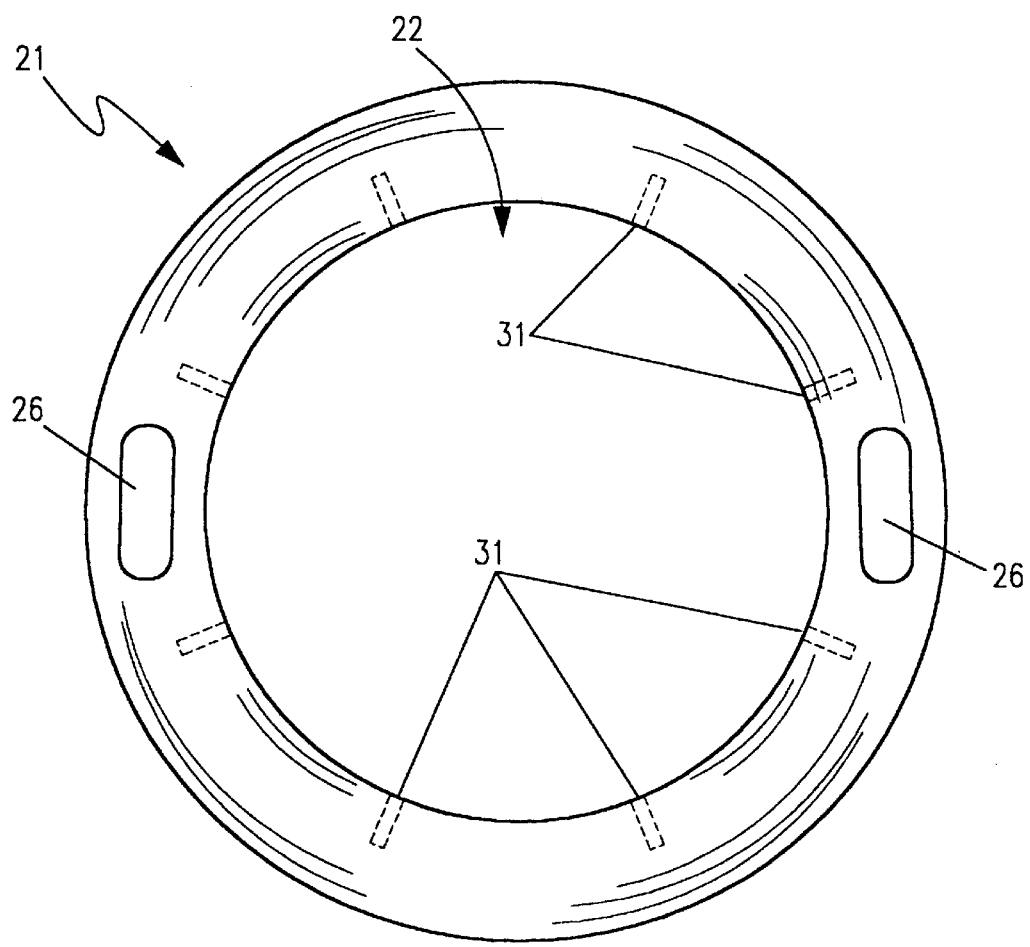
FIG. 3 is a top view of the frame portion of the multi-slice pizza cutter, according to the preferred embodiment of the present invention.
Figure 4:
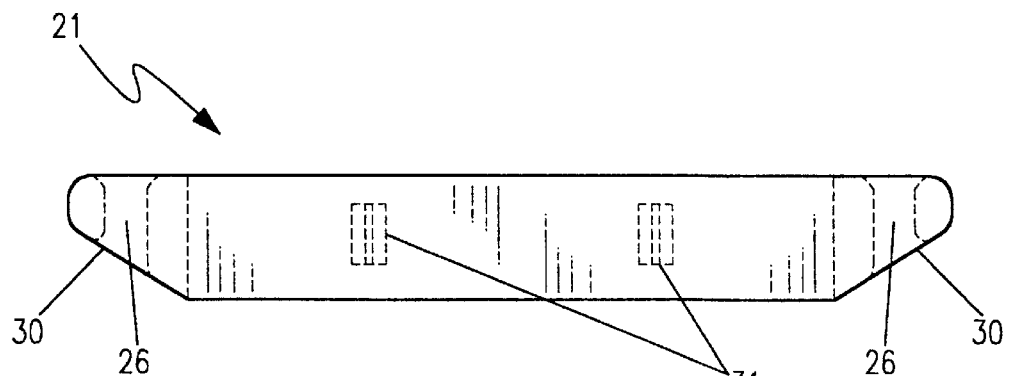
FIG. 4 is a side view of the frame portion of the multi-slice pizza cutter, according to the preferred embodiment of the present invention.

Referring now to FIGS. 3–4, depicted is the frame 21 portion of the pizza cutter 20, according to the preferred embodiment of the present invention. The frame 21 is constructed of wood, plastic or any other material suitable for high temperature use in a culinary environment. The handle apertures 26 consist of an elongated aperture that is contoured so as to provide an ergonomic fit with an average person's hand. Viewing the frame 21 from the side, it has a tapered edge 30 along the area outside the pizza receiving aperture 22 that serves to allow the user's fingers to wrap through the handle apertures 26 without interference from the surface upon which the pizza cutter 20 is placed. It is also envisioned in an alternate embodiment that the handle apertures 26 could be replaced by protruding handle members that attach to the upper surface of the frame 21. The frame 21 also includes a series of blade receiving slots 31 spaced radially along the interior of the frame 21, in fluid communication with the pizza receiving aperture 22. The blade receiving slots 31 are used to support the cutting blades 23 and will be discussed in further detail herein below.

Figure 5:
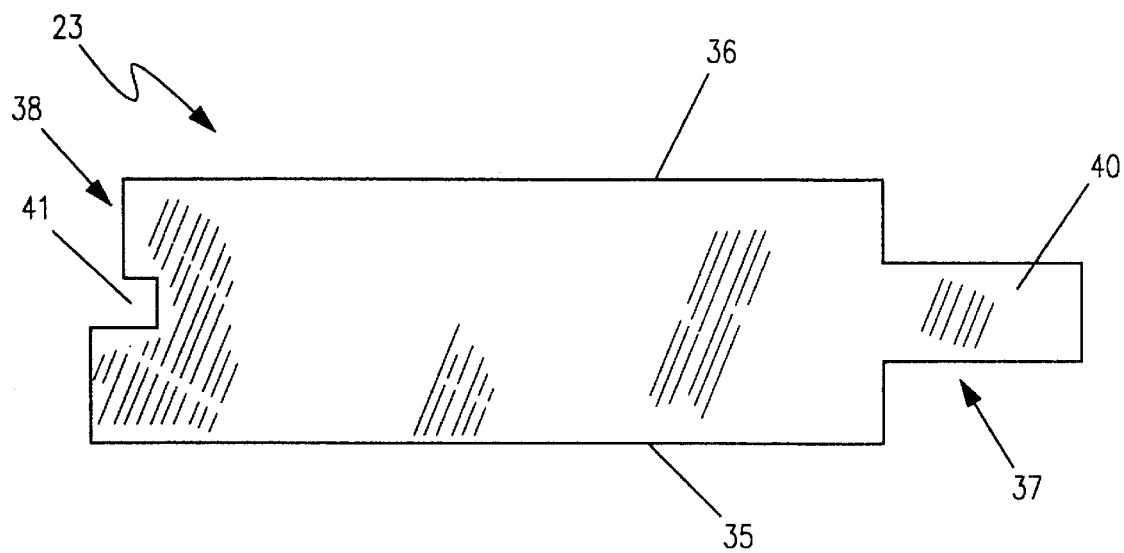
FIG. 5 is a side view of the cutting blade portion of the multi-slice pizza cutter, according to the preferred embodiment of the present invention.

Referring now to FIG. 5, depicted is the cutting blade 23 portion of the pizza cutter 20, according to the preferred embodiment of the present invention. The cutting blade 23 is generally rectangular in shape and is constructed of stainless steel, aluminum, or any other metal suitable for high temperature use in a culinary environment. The cutting blade 23 has a sharpened cutting edge 35 opposite a top edge 36 and a frame end 37 opposite a center end 38. The frame end 37 consists of a blade support tab 40 that is sized so as to fit snug within the blade receiving slots 31 in the frame 21. The center end 38 is contoured, forming a fastener receiving cutout 41 that will accept the profile of a conventional threaded fastener (not shown in FIGS. 4–5). The length of the cutting edge 35 is equal to that of the radius of the pizza receiving aperture 22, the result being that when the blade support tab 40 is inserted into a blade receiving slot 31, the cutting blade 23 will extend to the center of the pizza receiving aperture 22.

Figure 6:
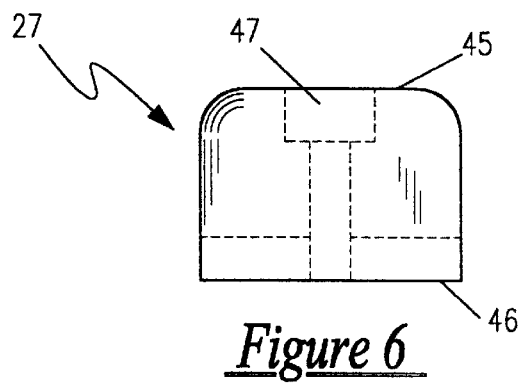
FIG. 6 is a side view of the center cap portion of the multi-slice pizza cutter, according to the preferred embodiment of the present invention.
Figure 7:
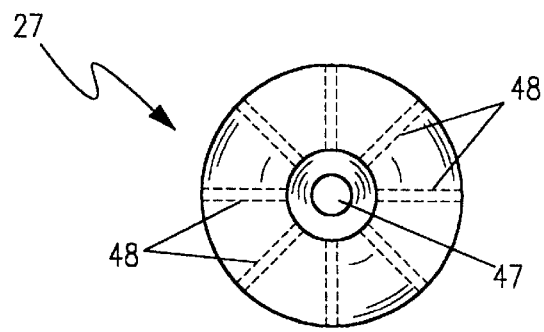
FIG. 7 is a top view of the center cap portion of the multi-slice pizza cutter, according to the preferred embodiment of the present invention.

Referring now to FIGS. 6–7, depicted is the center cap 27 portion of the pizza cutter 20, according to the preferred embodiment of the present invention. The center cap 27 is constructed of wood, plastic or any other material suitable for high temperature use in a culinary environment. The center cap 27 is generally cylindrical in shape with an outer surface 45 opposite a blade surface 46 and has a fastener receiving aperture 47 bored through its center. A series of blade receiving grooves 48 are spaced radially and equidistantly along the blade surface 46. The blade receiving grooves 48 are equal in number to the number of cutting blades 23 incorporated into the particular pizza cutter 20 model and are sized so as to receive the top edge 36 thereof. The center cap 27 allows for the use of a threaded fastener (not shown in FIGS. 6–7) to secure the cutting blades 23 at the center end 38.

Figure 8:
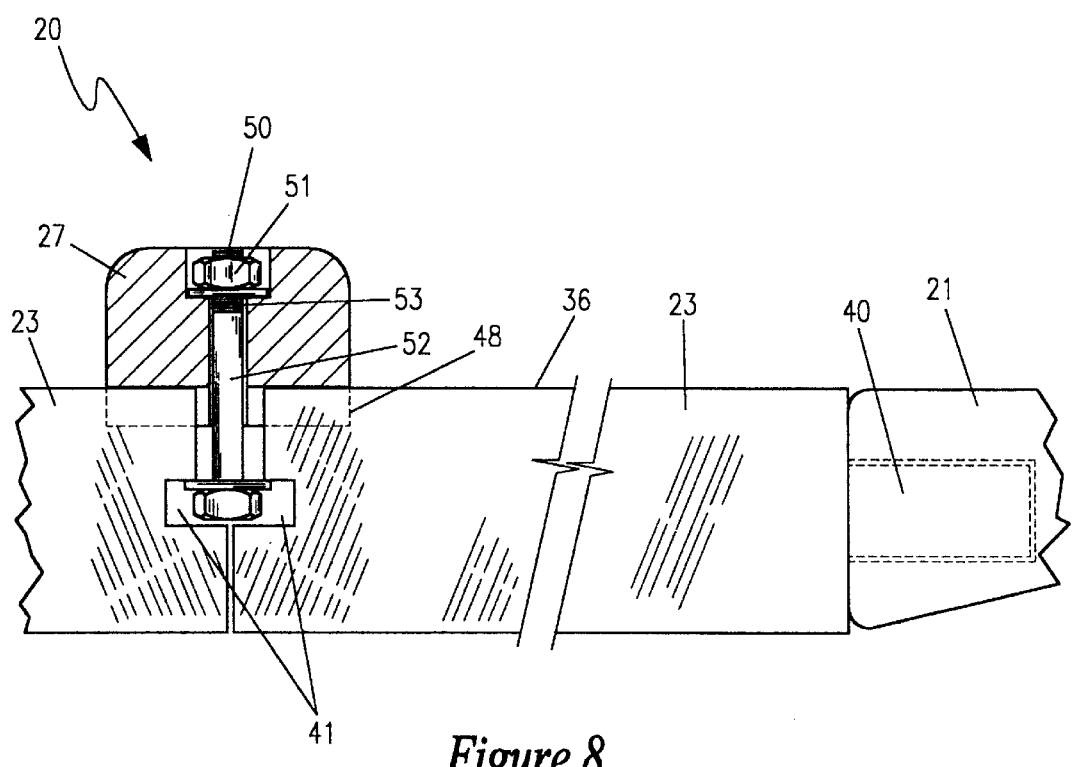
FIG. 8 is a magnified side view of the multi-slice pizza cutter depicting the assembly of the cutting blades within the frame portion, according to the preferred embodiment of the present invention.

Referring now to FIG. 8 in conjunction with FIGS. 1–7, depicted is the assembly of the pizza cutter 20, according to the preferred embodiment of the present invention. In assembling the pizza cutter 20, the blade support tabs 40 are inserted into the blade receiving slots 31, leaving the cutting blade 23 extend to the center of the pizza receiving aperture 22. Once all of the cutting blades 23 are installed in the frame 21, a threaded fastener 50, consisting of a nut 51 and bolt 52 or other suitable fastening device, is placed with in the fastener receiving cutouts 41 of the converging cutting blades 23 leaving the threaded portion 53 protruding above the cutting blades 23. The center cap 27 is then placed over the threaded fastener 50, the threaded portion 53 passing through the fastener receiving aperture 47. The center cap 27 is then adjusted so that the blade receiving grooves 48 receive the top edge 36 of the cutting blades 23. Installing and tightening the nut 51, the center cap secures the cutting blades 23 at the center end 38.

2. Operation of the Preferred Embodiment

Figure 9:
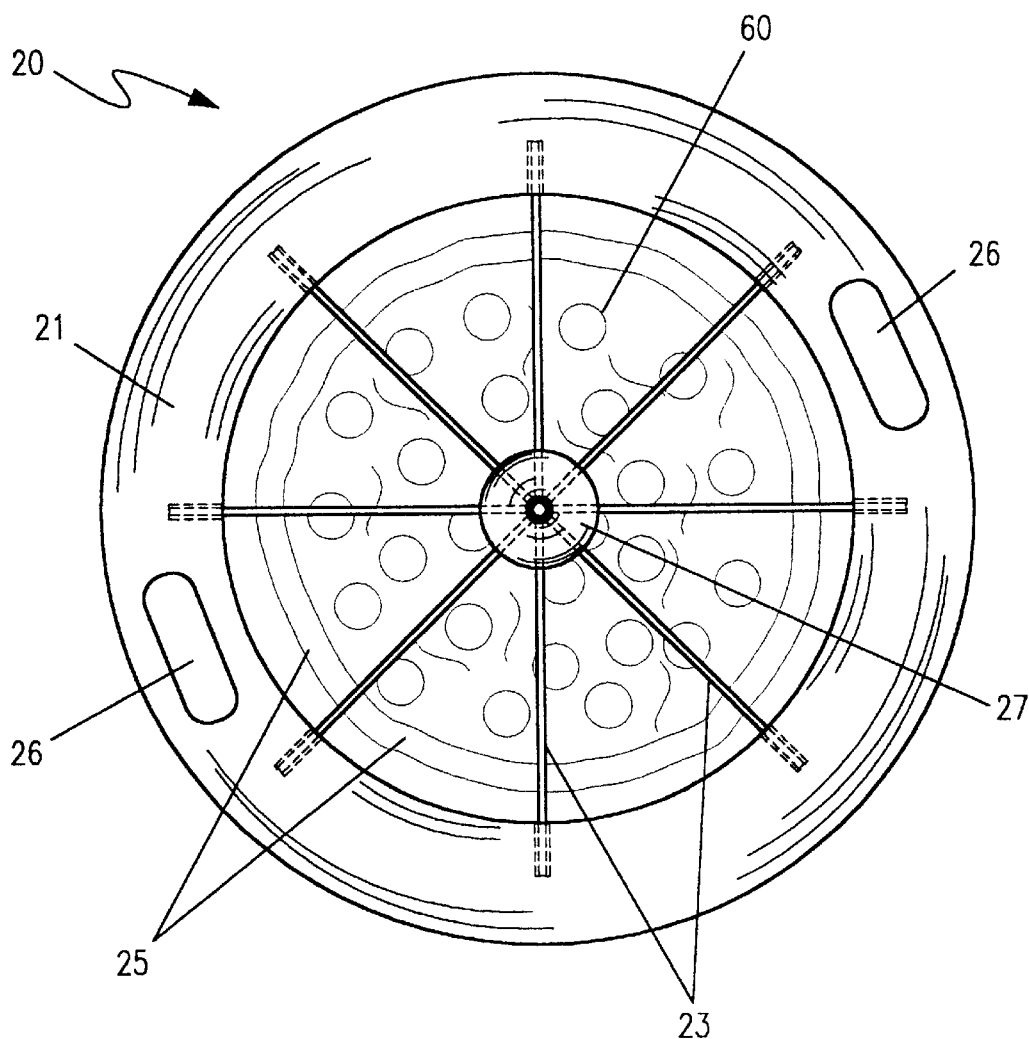
FIG. 9 is a top view of the multi-slice pizza cutter depicting its use in cutting a large pizza into multiple slices, according to the preferred embodiment of the present invention.
Figure 10:
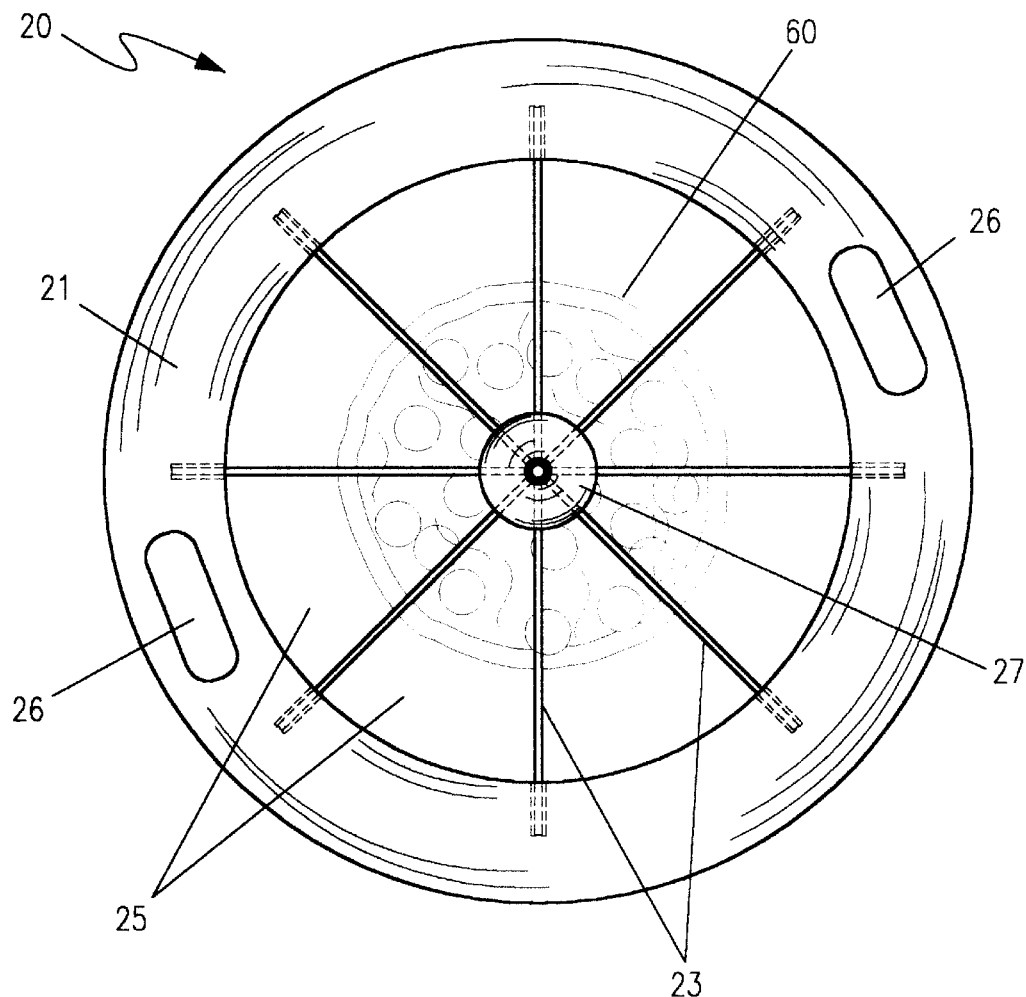
FIG. 10 is a top view of the multi-slice pizza cutter depicting its use in cutting a small pizza into multiple slices, according to the preferred embodiment of present invention.

In accordance with the preferred embodiment of the present invention and as shown in FIGS. 9–10, depicted is the use of the pizza cutter 20 in cutting a pizza 60 into uniform, equally-sized slices. The difference in the size of the pizza 60 is essentially irrelevant, as long as its diameter is such that it will fit through the pizza receiving aperture 22. In order to operate the pizza cutter 20, the user simply positions the pizza cutter such that the center of the pizza receiving aperture 22 coincides with the center of the pizza 60 and presses down on the frame 21. The cutting blades 23 will cut the pizza 60 into slices defined as by the dimensions of the slice segments 25.

While the preferred embodiments of the invention have been shown, illustrated, and described, it will be apparent to those skilled in this field that various modifications may be made in these embodiments without departing from the spirit of the present invention. For example, as mentioned herein above, the diameter of the frame 21 and the number of cutting blades 23 may vary, depending upon the intended application. In the case of small, "personal size" or extra-large pizzas for example, one may desire to slice it into a fewer or greater number of slices, respectively. It is for these reasons that the scope of the invention is set forth in and is to be limited only by the following claims.

What is claimed is:

1. A pizza cutter for cutting a pizza into uniform, equally-sized slices, said pizza cutter comprising:
    a frame having a top surface opposite a bottom surface, said frame having a circular pizza receiving aperture bored therethrough, providing fluid connectivity between said top surface and said bottom surface;
    a plurality of cutting blades having a cutting edge opposite a top edge and a frame end opposite a center end, said cutting blades attached to said frame at said frame end and equally spaced radially around said pizza receiving aperture, said cutting blades spanning said pizza receiving aperture, converging at the center thereof and positioned such that said cutting edge lies flush with said bottom surface; and
    fastening means for adjoining and supporting said center ends.

2. The pizza cutter of claim 1, wherein said frame further comprises handle means for allowing a user to grasp said pizza cutter during use without causing interference between said user's hands and the surface upon which said pizza cutter is being used.

3. The pizza cutter of claim 1, wherein said fastening means further comprises a center cap having blade receiving grooves that accept said top edges, supporting and maintaining the radial alignment thereof, said center cap having a threaded fastening means for securing top edges in said blade receiving grooves.

4. The pizza cutter of claim 1, wherein said frame further comprises a series of blade receiving slots equally spaced radially around said pizza receiving aperture, said frame end of said cutting blades further comprising blade support tabs that are received by said blade receiving slots, providing support therefor.

5. The pizza cutter of claim 1 wherein said frame and a center cap are constructed of materials that can withstand exposure to high temperatures in a culinary environment, said materials selected from the group consisting of wood, plastic, stainless steel and aluminum.

6. The pizza cutter of claim 1, wherein said cutting blades are constructed of stainless steel or aluminum.

* * * * *

UNITED STATES PATENT AND TRADEMARK OFFICE
CERTIFICATE OF CORRECTION

PATENT NO. : 6,557,260 B1
DATED : May 6, 2003
INVENTOR(S) : Morris

It is certified that error appears in the above-identified patent and that said Letters Patent is hereby corrected as shown below:

<u>Title page,</u>
Item [*] Notice, delete the phrase "by 0 days" and insert -- by 361 days --

Signed and Sealed this

Ninth Day of August, 2005

JON W. DUDAS
*Director of the United States Patent and Trademark Office*